United States Patent [19]
Marti

[11] Patent Number: 5,555,700
[45] Date of Patent: Sep. 17, 1996

[54] BOTTLE CONVEYING SYSTEM

[75] Inventor: Jean Marti, Kleve, Germany

[73] Assignee: Kisters Maschinenbau GmbH, Kleve, Germany

[21] Appl. No.: 529,544

[22] Filed: Sep. 18, 1995

[30] Foreign Application Priority Data

Nov. 24, 1994 [DE] Germany .................. 44 41 700.4

[51] Int. Cl.⁶ .................. B65B 21/12; B65B 21/24
[52] U.S. Cl. .................. 53/48.1; 53/48.7; 53/300; 198/418.6
[58] Field of Search .................. 53/48.1, 48.7, 53/48.6, 300, 550; 198/836.1, 418.6, 431

[56] References Cited

U.S. PATENT DOCUMENTS

| | | |
|---|---|---|
| 4,332,123 | 6/1982 | Calvert .................. 53/48.1 X |
| 4,389,832 | 6/1983 | Calvert .................. 53/48.1 |
| 5,148,654 | 9/1992 | Kisters .................. 53/48.7 X |
| 5,154,039 | 10/1992 | de Guglielmo .................. 53/48.7 X |

FOREIGN PATENT DOCUMENTS 44 41 700.4  11/1994  Germany.

Primary Examiner—Horace M. Culver
Attorney, Agent, or Firm—Watson Cole Stevens Davis, P.L.L.C.

[57] ABSTRACT

A bottle conveying and packaging system has guide tracks for guiding groups of bottles positioned adjacent one another in a transverse direction, from a grouping station to a packaging station. The guide tracks correspond in number to the transversely lying bottles in the groups, and the tracks engage beneath collars of the bottles located beneath the bottle closures thereof. The tracks have horizontal, upwardly inclined and downwardly inclined sections, and push rods on an endless belt are provided for pushing the groupings along the tracks from an incoming conveyor to the packaging station at which the bottles rest on a conveyor at that station where packaging material is fed, whereafter the packaged groupings are conveyed to a foil wrapping station.

7 Claims, 2 Drawing Sheets

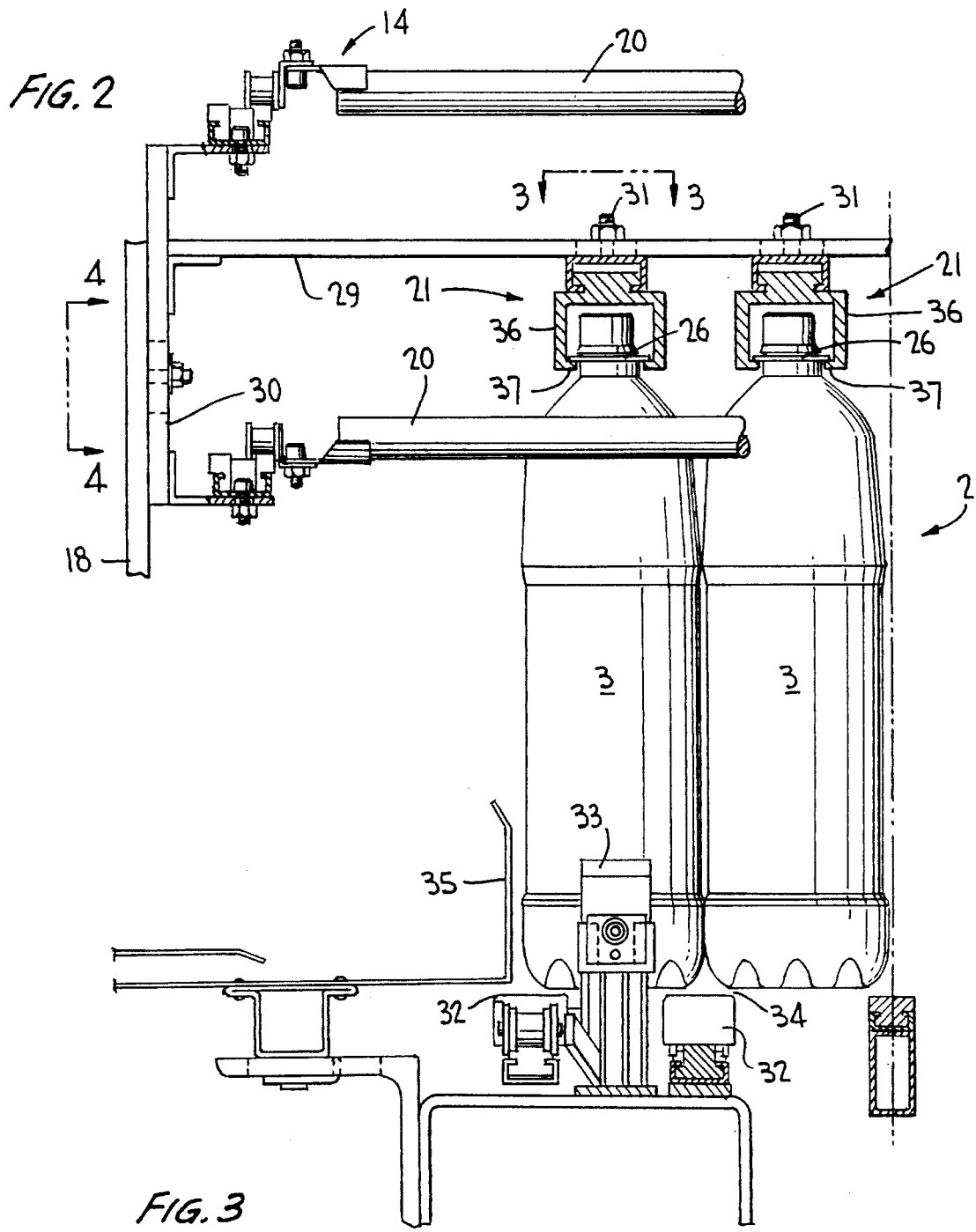
FIG. 2
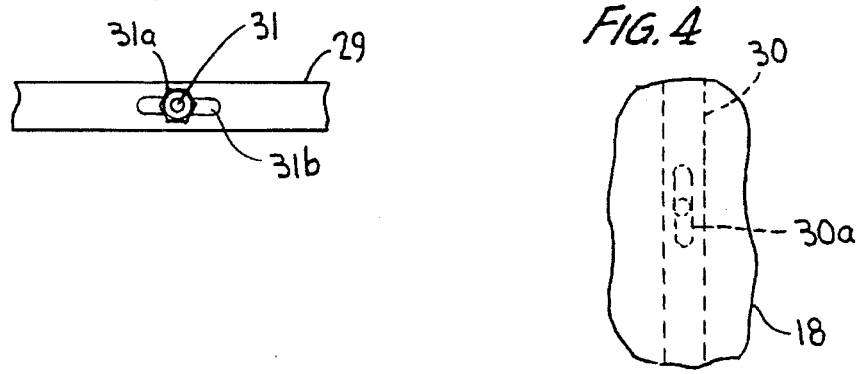
FIG. 3
FIG. 4

BOTTLE CONVEYING SYSTEM

BACKGROUND OF THE INVENTION

This invention relates to a system for conveying bottle groupings to prevent the bottles from tipping over as they are conveyed from a grouping station to a packaging station. The bottles are arranged in groups at the grouping station with the bottles lying at least transversely adjacent one another relative to the conveying direction. At the packaging station the bottles are packaged utilizing packaging material such as foldable carton blanks which are folded into trays, or flat carton blanks.

The bottles have neck flanges or collars located beneath the bottle closures, and the conveying system includes a conveyor frame having guide means extending in the conveying direction provided for engaging the bottles beneath their neck flanges during the conveying process to prevent the bottles from tipping over.

When packaging mass products, especially in the food and beverage industry, ever higher requirements are set for the packaging machinery with regard to speed and reliability. Known automated equipment is utilized for packaging the products, such as cans or bottles, into groups, into cartons, tray packaging, or only in plastic wrap. Typical machine rates currently operate in the range of 100 packages per minute. Each disruption of the process means machine failure and thus a significant loss of production.

A disruption of operations of this type occurs often during the product packaging operation. For articles to be packaged wherein the height of the articles is significantly greater than the width and length thereof such that the articles have a high center of gravity, it is highly likely that when accelerating or slowing the conveying machine or when transferring from one transport conveyor to the other, one or more of these articles could fall over, which generally starts a chain reaction. Consequently, the machine must be stopped and the articles again uprighted with effort and time delay, and the machine restarted.

A conveying machine of the type to which the invention pertains is disclosed in German published application No. 42 07 725, in which bottles are conveyed from a grouping station to a packaging station over a conveyor, whereby the bottles are prevented from falling over by the provision of movable support rods located ahead of and behind a row of bottles arranged cross-wise to one another, to thereby prevent the bottles from falling over during the conveying operation in cooperation with rails guiding the necks of the bottles. The support rods remain in position until the group of bottles is encased in a foil, whereby the rods are first wrapped together with the bottles. The rods are then withdrawn laterally from the encasing and are moved back along the conveying direction to the grouping station. With such a known system, however, it is only possible to package the groups of bottles in a foil wrapping, while tray packaging is not possible using this known system. Moreover, this prior art system is most suited for conveying and packaging groups of bottles which typically comprise a row of bottles arranged adjacent one another in a lateral direction relative to the conveying direction.

SUMMARY OF THE INVENTION

It is therefore an object of the present invention to provide a bottle conveying and packaging system such that groups of several rows of bottles arranged adjacent to one another, for example, 6-, 8-, or 12-packs, can be conveyed from the grouping station to the packaging station without tipping over, whereby the bottle groupings may be placed on trays or on flat cartons and/or wrapped in foil.

More particularly, the system according to the invention includes a machine frame having guide means extending in the conveying direction between the grouping and packaging stations, such guide means including a plurality of guide tracks corresponding to the number of transversely lying bottles in the groups, each of the tracks having means engaging beneath the bottle flanges. The tracks have a first section parallel to the transport plane of the bottles at the entrance end of the machine, followed by an upwardly inclined section in the conveying direction, followed by a second section parallel to the transport plane of the bottles, followed in the conveying direction by a downwardly inclined section and followed in the conveying direction by a third track section parallel to the transport plane. The packaging station includes conveyor means on the machine frame at the third section, and means is provided on the frame for transporting packaging material to such conveying means. The tracks at the third station are spaced above the conveyor means a predetermined distance, permitting the groups of bottles to rest upon the packaging material. An endless moving belt or chain on the machine has a plurality of transversely extending rods for successively pushing against the groups of bottles for transporting them in the conveying direction along the guide tracks from the grouping station to a starting upstream end of the packaging station.

At the packaging station, means are provided for folding the packaging material for each of the bottle groups, and the system includes a wrapping station adjacent the packaging station. The wrapping station includes means for wrapping the bottle groups and associated packaging materials with the foil. The engaging bottle flange means on the tracks are spaced above the conveyor at the third track section a distance less than the distance between a typical bottle flange and the bottom of the bottle.

The conveyor machine frame has conveyor means at an entrance end thereof for conveying the bottle groups in the conveying direction at a given velocity, and the belt or chain on which the rods are mounted is movable at a second velocity greater than such given velocity, and the conveyor at the third section is movable at a velocity equal to such second velocity.

The guide means is vertically adjustable relative to the transport plane, and the guide tracks are mounted on the machine frame for transverse adjustment.

The guide means and the movable belt or chain supporting the rods are together mounted on brackets on the machine frame for simultaneous vertical adjustment relative to the transport plane.

The guide tracks are substantially U-shaped in cross-section, presenting depending spaced legs and having inwardly extending projections on the legs defining the means engaging beneath the bottle flanges.

After an appropriate number of grouped bottles are conveyed from the grouping station to the conveyor at the entrance end of the machine, the bottle necks are guided into the guide means such that a guide track engages beneath the bottle neck collar, and the transversely extending rods successively push against the bottle groups in the conveying direction along the guide tracks from behind the bottle groups. The velocity of the moving rod pushing from behind the bottle group is somewhat greater than the transport velocity of the conveyor at the end of the machine. Thus, a carrying rod pushes the entire grouping along the guide tracks which incline upwardly so that the bottles lose their contact with such conveyor. During the continuing course, bottle groups are conveyed further with the aid of the carrying rod along the horizontal area of the guide tracks and thus reach the area of the packaging station. At this area, the guide tracks incline downwardly so that the bottles rest upon the packaging material fed to a conveyor provided at the packaging station. Thus, the bottles are prevented from tipping over during this conveying operation as they are guided by their collars to the packaging station. Provision of an additional conveyor belt is eliminated in contrast to the prior art machine discussed above, since the carrying rods push the bottle groups from the entrance conveyor to the packaging station. By contrast, the prior art provides guide rails, support rods, and a transport conveyor.

At the packaging station, the bottle groups are lowered on to the tray blanks fed to the conveyor at such station by the tracks such that the undersides of the collars lose contact with track engagement. During the folding process, the tray and the bottle grouping associated therewith are conveyed further toward the wrapping station at the same velocity as that of the cross rods. Since the collars are now free, any tilting caused by friction in this area is now avoided.

The bottle grouping packaged in the tray may then be conveyed to a palleting station or to a wrapping station at which a plastic foil is wrapped about the bottle grouping with its tray. The packaged bottle group may then be shrunk wrapped, after which it is conveyed to the palleting station.

The guide tracks can be exchanged with other tracks of different opening widths as needed, without departing from the invention.

BRIEF DESCRIPTION OF THE DRAWINGS

FIG. 2 is a part sectional view, at an enlarged scale, taken substantially along the line 2—2 of FIG. 1 .;

FIG. 3 is a detail view taken substantially along the line 3—3 of FIG. 2; and

FIG. 4 is a detail view taken substantially along the line 4—4 of FIG. 2.

DETAILED DESCRIPTION OF THE INVENTION

Figure 1:
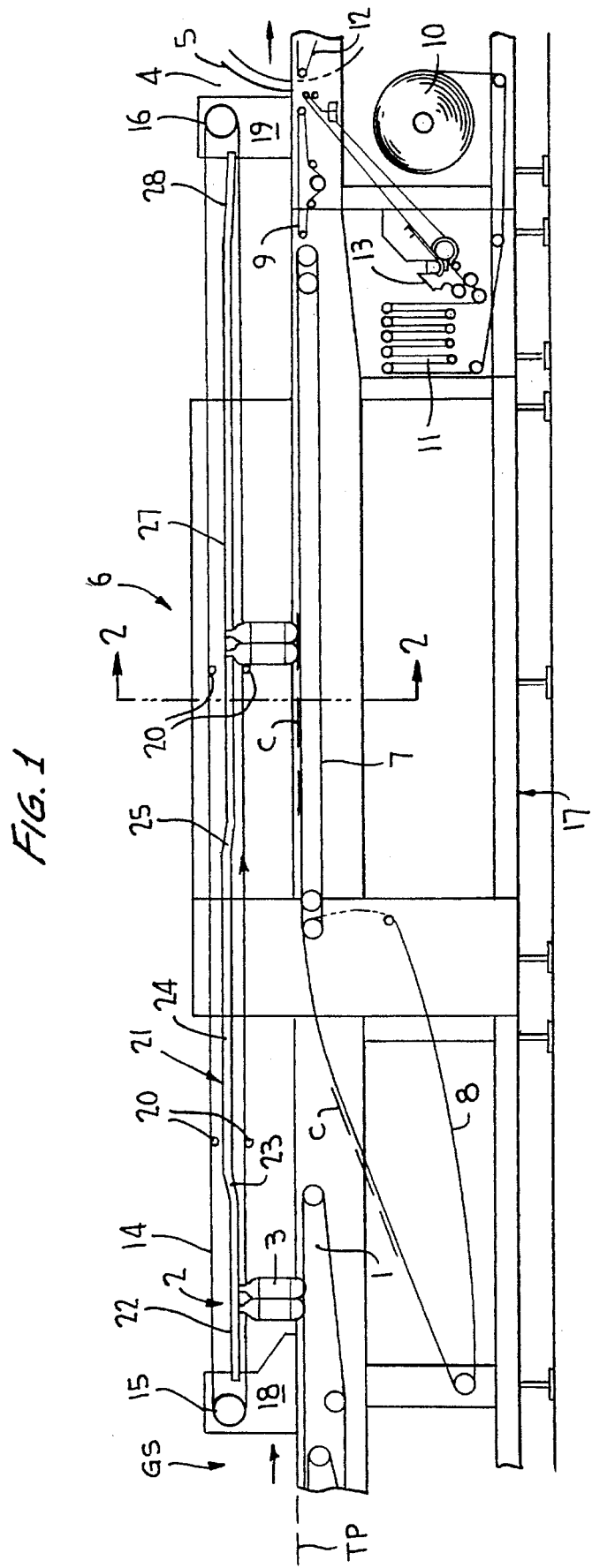
FIG. 1 is a schematic side elevational view of a bottle conveying machine incorporating the invention.

The bottle conveying system according to the invention is schematically shown in FIG. 1 as comprising a machine frame 17 having a supply conveyor 1 for conveying bottles 3 arranged into bottle groups 2 at grouping station GS into the machine, the bottle groups to be subsequently conveyed. as will be described, to a transfer location 4, and to a wrapping station 5. Between supply conveyor 1 and wrapping station 5 is a packaging or folding station 6, at which a transport conveyor 7 is provided on the machine. A supply conveyor 8 is mounted on the machine frame for transporting to conveyor 7 packaging material which may be in the form or simple cardboard plates C. The packaging blanks are conveyed from a storage supply (not shown) at an upward incline to packaging station 6. At the downstream end of conveyor 7, a further conveyor 9 is situated immediately adjacent wrapping station 5.

Beneath conveyor 9 is a device for supplying foil sections to the wrapping station. The foil is unrolled from a roll 10, fed through a dancer roll 11 and from there conveyed at an upward incline between conveyor belt 9 and wrapping station 5 to a conveyor 12, partially shown at the wrapping station. Between dancer roll 11 and the transport plane TP of the bottles, a cutting device 13 is provided for dividing the foil into sections. The leading end of the foil when lying on conveyor 12 is overlain by the product grouping to be wrapped. A circulating rod (not shown) moves beneath the foil section and lays it through the gap between belt 9 and station 5 and up and around the product grouping until it hangs down behind a conveyor 12 under the transport plane. The product grouping conveyed further on conveyor 12 moves beyond the end of the foil section so that the product group is completely encased.

An endless, movable belt or chain 14 on the machine frame located above the transport plane extends between turnabout rollers 15 and 16 mounted on brackets 18 and 19 on machine frame 17. Although only one chain 14 is shown, it should be clear that such a chain can be provided on both sides of the transport track. Push rods 20 are connected to chain 14 and extend transversely in the direction of conveyance of the bottles through the machine. Rods 20 situated at the lower run of chains 14, travelling in the direction of the arrow shown, are disposed at such a height over the transport plane that they contact bottles 3 at the rear of the grouping substantially in an area beneath the bottle neck (see FIG. 2).

Located between rollers 15 and 16 of chain 14 are guide means 21 mounted at opposite ends on brackets 18, 19, and located between the upper and lower runs of chain 14, as shown in FIG. 1. Guide means 21 are in the form of a plurality of guide tracks, more clearly shown in FIG. 2, arranged adjacent one another in a transverse direction, and corresponding to the number of transversely lying bottles 3 of the bottle groups lying adjacent one another in a crosswise direction relative to the conveying direction. The guide tracks shown have six sections. The first section 22 parallel to transport plane TP begins over supply conveyor 1 and extends horizontally just up to the downstream end of the conveyor. A section 23 is inclined upwardly, followed by a second horizontal section 24 lying parallel to the transport plane, up to approximately the start of packaging station 6 at which the tracks are inclined downwardly at a section 25 such that bottles 3 of each group rest at their bottoms on a predetermined carton blank C, which is conveyed into the packaging station 6 by transport conveyor 8. At the packaging station, collars 26 of the bottles, located just beneath the bottle closures thereof, are no longer engaged by guide tracks 21. A third horizontal section 27 of the guide tracks lies parallel to the transport plane followed by a slight downward incline at section 28 to the end of the tracks. The end of the guide tracks is located above conveyor 12 approximately in the area of turnabout roller 16 on which the drive for chain 14 can also be arranged.

As clearly shown in FIG. 2, the adjacent guide tracks 21 are attached to cross arms 29 (only one shown) which are connected at opposite ends thereof to a pair of brackets 18 and to a pair of brackets 19 via vertical support channels 30. Support channels 30 likewise support the endless chain or chains 14.

Guide tracks 21 are connected to cross arms 29 by bolts 31 and nuts 31a, the bolts extending through elongated openings 31b (FIG. 3) to facilitate an adjustable connection of the guide tracks in a crosswise direction.

The guide tracks are likewise adjustable in height as suitable fasteners extending through elongated vertical openings 30a in support channels 30 (FIG. 4) are used to connect the support channels to bracket pairs 18 and 19.

Since chains 14 supporting rods 20 are likewise mounted to support channels 30, rods 20 together with the guide tracks are adjustable simultaneously in a vertical direction.

In FIG. 2, only that portion of the structure is shown to the left of the midplane b. At the packaging station are elements 32 of transport conveyor 7, as well as a folding device 33 shown with a portion thereof extending upwardly during a blank folding operation. The carton blank (not shown) present for tray packaging or plate packaging is typically located between conveyor 7 and bottles 3. Also shown is a guide plate 35 for a side of the carton blank to be folded.

Each guide means 21 includes an inverted U-shaped portion having spaced, depending legs 36 with inwardly facing projections 37 at the lower ends of the legs, the projections lying perpendicular to the legs. Projections 37 underlie bottle neck collars 26 for engaging the bottles thereat, the inward spacing of a facing pair of projections corresponding approximately, with some play, to the bottle neck diameter, so that collars 26 of the bottles 3 lie securely on projections 37.

Product groupings 2 arriving on conveyor 1 to the machine are guided along guide means 21 whereby the bottle necks with screw top closures with the collars beneath the closures proceed along the guide means within the inverted U-shaped portions thereof. As the bottle groupings are transported by conveyor 1, a rod 20 at the lower run of chain 14 contacts the rearward side of the bottle grouping in the conveying direction at a velocity $V_m$ of the rod which is greater than the transport velocity $V_t$ of conveyor 1. Thus, rod 20 pushes the entire grouping 2 along the guide means to upwardly inclined section 23 and along horizontal section 24 at which the bottles are suspended without contacting any other portion of the machine. The bottle grouping is pushed, freely suspended, through horizontal section 24 to section 25 of guide means 21 at which the bottles are set on carton blanks C fed to packaging station 6. Section 27 of the guide means at packaging station 6 is at a predetermined elevation above conveyor 7 such that the distance between projections 37 and the conveyor 7 is slightly less than the distance between collar 26 and the bottom wall of the bottle. The bottles of the grouping thus rest upon the carton blanks at station 6, such that collars 26 lift off projections 37.

Conveyor 7 at the packaging station has the same transport velocity as rod 20. At the packaging station, the tray blank may be folded up and glued together beneath the product grouping, such that the entire tray-packed grouping is transported to conveyor 9 and from there to the wrapping station, where it is wrapped with a section of foil as described above.

Alternatively, the product grouping is lowered onto a simple flat plate at the packaging station requiring no folding, such that the grouping with this carton blank is conveyed to the wrapping station for wrapping.

Another alternative is to convey the product grouping 2 from rod 20 through packaging station 6 without blanks being fed into the packaging station. Thus, the bottle groupings are further transported to track section 28, at which they are set onto conveyor 9 before reaching the wrapping station where the product grouping is wrapped alone by foil without any additional packaging. For such an alternative, the transport velocity of conveyor 9 would be as great as the velocity of moving rod 20.

Obviously, many other modifications and variations of the present invention are made possible in the light of the above teachings. It is therefore to be understood that within the scope of the appended claims the invention may be practiced otherwise than as specifically described.

What is claimed is:

1. A system for conveying bottles, respectively having neck collars located beneath closures on the bottles, in a conveying direction from a grouping station at which the bottles are arranged in groups with bottles lying at least transversely to one another to a packaging station at which the bottle groups are packaged, comprising a machine frame having guide means extending in said direction between said stations and means defining a horizontal transport plane, said guide means comprising a plurality of guide tracks corresponding to the number of transversely lying bottles in the groups, each of said tracks having means engaging beneath the bottle collars and having a first horizontal section lying parallel to said transport plane followed in said conveying direction by an upwardly inclined section followed in said conveying direction by a second horizontal section parallel to said transport plane followed in said conveying direction by a downwardly inclined section followed in said conveying direction by a third horizontal section parallel to said transport plane, said packaging station including conveyor means on said frame at said third section, means on said frame for transporting packaging material to said conveyor means, said tracks at said third station being spaced above said conveyor means a predetermined distance permitting the groups of bottles to rest upon the packaging material, an endless moving belt or chain on said machine having a plurality of transversely extending rods for successively pushing against the groups of bottles for transporting same in said conveying direction along said guide tracks from said grouping station to a starting end of the packaging station.

2. The system according to claim 1, wherein the packaging station includes means for folding the packaging material for each of the groups of bottles, and further comprising a wrapping station adjacent the packaging station, said wrapping station including means for wrapping each group of bottles associated with the packaging material with a foil, and wherein said engaging means of said tracks are spaced above said conveyor means at said third section a distance less than the distance between a bottle flange and a bottom of a bottle.

3. The system according to claim 1, wherein said frame has conveyor means at an entrance end of said frame for conveying the groups of bottles in said conveying direction at a given velocity, said belt or chain being movable at a second velocity greater than said given velocity, and said conveyor means at said third section being movable at a velocity equal to said second velocity.

4. The system according to claim 1, wherein means on said frame are provided for vertically adjusting said guide means relative to said transport plane.

5. The system according to claim 1, wherein said guide tracks are mounted to said frame for transverse adjustment.

6. The system according to claim 1, wherein said guide means and said moving belt or chain are together mounted on brackets on said frame for simultaneous vertical adjustment relative to said transport plane.

7. The system according to claim 1, wherein said guide tracks each have substantially inverted U-shaped sections comprising depending legs and inwardly facing projections on said legs defining said means engaging beneath the bottle collars.

* * * * *